(12) United States Patent
Li et al.

(10) Patent No.: US 9,813,773 B2
(45) Date of Patent: Nov. 7, 2017

(54) SUBTITLE DISPLAY METHOD AND SUBTITLE DISPLAY DEVICE

(71) Applicant: Huawei Device Co., Ltd., Shenzhen (CN)

(72) Inventors: Zhilei Li, Shenzhen (CN); Ying Zhou, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 10 days.

(21) Appl. No.: 15/031,445

(22) PCT Filed: Oct. 24, 2014

(86) PCT No.: PCT/CN2014/089427
§ 371 (c)(1),
(2) Date: Apr. 22, 2016

(87) PCT Pub. No.: WO2015/058712
PCT Pub. Date: Apr. 30, 2015

(65) Prior Publication Data
US 2016/0269797 A1    Sep. 15, 2016

(30) Foreign Application Priority Data

Oct. 24, 2013   (CN) .......................... 2013 1 0508612

(51) Int. Cl.
*H04N 7/00*  (2011.01)
*H04N 11/00* (2006.01)
(Continued)

(52) U.S. Cl.
CPC ..... *H04N 21/4884* (2013.01); *H04N 21/4856* (2013.01); *H04N 2005/44526* (2013.01)

(58) Field of Classification Search
USPC ....... 348/468, 465, 460, 461, 563, 564, 523, 348/239, 173, 567, 706, 714, 716, 719,
(Continued)

(56) References Cited

U.S. PATENT DOCUMENTS 6,008,802 A * 12/1999 Iki ...................... H04N 5/44543
348/460
7,509,667 B1 * 3/2009 Cook ................... H04N 7/1675
380/200
(Continued)

FOREIGN PATENT DOCUMENTS

CN          101093703 A      12/2007
CN          102118643 A      7/2011
(Continued)

OTHER PUBLICATIONS

Partial English Translation and Abstract of Chinese Patent Application No. CN103220474, Apr. 28, 2016, 3 pages.
(Continued)

*Primary Examiner* — Jefferey F Harold
*Assistant Examiner* — Mustafizur Rahman
(74) *Attorney, Agent, or Firm* — Conley Rose, P.C.

(57) ABSTRACT

Embodiments of the present disclosure provide a subtitle display method and a subtitle display device, and relate to the field of communications technologies. Category content is presented to a user in an interactive graphic manner, so that the user can select corresponding category content according to the user's preference, and subtitles corresponding to the category content are displayed. The method includes receiving a subtitle file, and parsing a category label of the subtitle file, where the category label includes category content; presenting, on a display device in an interactive graphic manner, the category content for a user to perform selection; and receiving a result of selecting one or
(Continued)

more pieces of the category content by the user, and displaying, according to the selection result, subtitles corresponding to the selected category content, therefore classified display of subtitles is implemented.

14 Claims, 3 Drawing Sheets

(51) Int. Cl.
*H04N 21/488* (2011.01)
*H04N 21/485* (2011.01)
*H04N 5/445* (2011.01)

(58) Field of Classification Search
USPC ..... 348/725, 731, 739, 231.1, 231.3, 42, 43, 348/46; 725/32, 14, 34, 35, 45, 46, 90, 725/91, 109, 114, 137; 386/241, 243, 386/244, 248, 249, 287, 288
See application file for complete search history.

(56) References Cited

U.S. PATENT DOCUMENTS

| | | | |
|---|---|---|---|
| 2005/0058435 A1 | 3/2005 | Chung et al. | |
| 2006/0048184 A1* | 3/2006 | Poslinski | H04N 5/44543 725/45 |
| 2008/0107397 A1 | 5/2008 | Kang et al. | |
| 2009/0060452 A1 | 3/2009 | Chaudhri | |
| 2009/0169181 A1* | 7/2009 | Priyadarshi | G11B 27/034 386/328 |
| 2009/0207305 A1 | 8/2009 | Fujita et al. | |
| 2010/0030744 A1* | 2/2010 | DeShan | G06F 17/3082 715/764 |
| 2010/0188572 A1* | 7/2010 | Card, II | H04N 5/445 348/468 |
| 2010/0225807 A1* | 9/2010 | Mears | H04N 5/44513 348/468 |
| 2010/0283898 A1* | 11/2010 | Mears | H04N 5/44513 348/468 |
| 2011/0088075 A1* | 4/2011 | Eyer | H04N 5/44508 725/114 |
| 2011/0141358 A1* | 6/2011 | Hardacker | H04N 5/44513 348/563 |
| 2011/0273534 A1* | 11/2011 | Luthra | H04N 13/0029 348/43 |
| 2012/0038745 A1* | 2/2012 | Yu | H04N 13/0022 348/46 |
| 2013/0100347 A1 | 4/2013 | Zinovieva | |
| 2013/0179992 A1* | 7/2013 | Ziskind | G06F 21/10 726/30 |
| 2013/0182072 A1* | 7/2013 | Seo | H04N 13/004 348/43 |
| 2013/0185760 A1 | 7/2013 | Yamaishi et al. | |
| 2013/0302014 A1 | 11/2013 | Uchimura | |
| 2014/0096171 A1* | 4/2014 | Shivadas | H04N 21/27 725/109 |
| 2014/0096269 A1* | 4/2014 | Amidei | H04L 63/0435 726/29 |
| 2014/0282711 A1* | 9/2014 | Xiong | H04N 21/4856 725/34 |
| 2014/0300812 A1* | 10/2014 | Uchimura | H04N 21/4318 348/468 |
| 2014/0359679 A1* | 12/2014 | Shivadas | H04N 21/8455 725/90 |
| 2015/0237298 A1* | 8/2015 | Garland | H04N 5/04 348/466 |
| 2015/0382071 A1* | 12/2015 | Aravamudan | H04N 21/4856 725/14 |

FOREIGN PATENT DOCUMENTS

| | | |
|---|---|---|
| CN | 102291542 A | 12/2011 |
| CN | 102843603 A | 12/2012 |
| CN | 103220474 A | 7/2013 |
| CN | 103370929 A | 10/2013 |
| JP | 2004194131 A | 7/2004 |
| JP | 2005217816 A | 8/2005 |
| JP | 2007501486 A | 1/2007 |
| JP | 2008053991 A | 3/2008 |
| JP | 2012169885 A | 9/2012 |
| WO | 2005013276 A1 | 2/2005 |
| WO | 2006092993 A1 | 9/2006 |
| WO | 2012111513 A1 | 8/2012 |

OTHER PUBLICATIONS

Barbero, J., et al., "Production and Distribution Workflow for Closed Captioning," 2010 International Conference on Distributed Frameworks for Multimedia Applications (DFmA), Aug. 2, 2010, pp. 163-168.
Dolan, M., et al., "Timed Text Markup Language (TTML) 1.0," W3C, Retrieved from the Internet: URL:http://www.w3.org/TR/2010/REC-ttaf1-dfxp-20101118 [Retrieved on Feb. 17, 2015], Nov. 18, 2010, 135 pages.
Foreign Communication From a Counterpart Application, European Application No. 14856358.8, Extended European Search Report dated Jun. 29, 2016, 13 pages.
Foreign Communication From a Counterpart Application, PCT Application No. PCT/CN2014/089427, English Translation of International Search Report dated Jan. 26, 2015, 2 pages.
Foreign Communication From a Counterpart Application, PCT Application No. PCT/CN2014/089427, English Translation of Written Opinion dated Jan. 26, 2015, 5 pages.
Machine Translation and Abstract of Chinese Publication No. CN102291542, dated Dec. 21, 2011, 14 pages.
Foreign Communication From A Counterpart Application, Chinese Application No. 201310508612.7, Chinese Office Action dated Apr. 17, 2017, 9 pages.
Suzuki, R., et al., "A Tool for Designing Smells Synchronized with Video", Multimedia, Dispersion, Cooperation and Mobile (DICOMO 2013) Symposium Proceedings [CD-ROM], Japan, Information Processing Society of Japan, Jul. 10, 2013, vol. 2013, No. 2, pp. 353-360.
Partial English Translation of Suzuki, R., et al., "A Tool for Designing Smells Synchronized with Video", Multimedia, Dispersion, Cooperation and Mobile (DICOMO 2013) Symposium Proceedings [CD-ROM], Japan, Information Processing Society of Japan, Jul. 10, 2013, vol. 2013, No. 2, pp. 353-360.
Machine Translation and Abstract of Japanese Publication No. JP2004194131, dated Jul. 8, 2004, 16 pages.
Machine Translation and Abstract of Japanese Publication No. JP2005217816, dated Aug. 11, 2005, 19 pages.
Machine Translation and Abstract of Japanese Publication No. JP2008053991, dated Mar. 6, 2008, 15 pages.
Foreign Communication From A Counterpart Application, Japanese Application No. 2016525868, Japanese Office Action dated Aug. 8, 2017, 4 pages.
Foreign Communication From a Counterpart Application, Japanese Application No. 2016525868, English Translation of Japanese Office Action dated Aug. 8, 2017, 4 pages.

* cited by examiner

SUBTITLE DISPLAY METHOD AND SUBTITLE DISPLAY DEVICE

CROSS-REFERENCE TO RELATED APPLICATIONS

This application is a U.S. National Stage of International Application No. PCT/CN2014/089427, filed on Oct. 24, 2014, which claims priority to Chinese Patent Application No. 201310508612.7 filed on Oct. 24, 2013, both of which are incorporated herein by reference in their entireties.

TECHNICAL FIELD

The present disclosure relates to the field of communications technologies, and in particular, to a subtitle display method and a subtitle display device.

BACKGROUND

For a television program with subtitles, the subtitles of the television program may be superimposed on a television signal using a dedicated device (for example, a set-top box). Currently, display content of subtitles is very rich, and there are also various subtitle presentation methods. That is, different roles can be presented using subtitles of different colors, and different scenes can also be presented using different fonts.

However, although richer presentation manners of subtitles are provided currently, no more options are provided for users.

SUMMARY

Embodiments of the present disclosure provide a subtitle display method and a subtitle display device, where category content is presented to a user in an interactive graphic manner, so that the user can select corresponding category content according to the user's preference, and subtitles corresponding to the category content are displayed.

To achieve the foregoing objective, the following technical solutions are used in the embodiments of the present disclosure.

According to one aspect, a subtitle display method is provided, including receiving a subtitle file, and parsing a category label of the subtitle file, where the category label includes category content; presenting, on a display device in an interactive graphic manner, the category content for a user to perform selection; and receiving a result of selecting one or more pieces of the category content by the user, and displaying, according to the selection result, subtitles corresponding to the selected category content.

In a first possible implementation manner of a first aspect, the displaying subtitles corresponding to the selected category content includes displaying the subtitles for which an attribute value of a category attribute is the selected category content.

With reference to the first possible implementation manner of the first aspect, in a second possible implementation manner, the displaying subtitles for which an attribute value of a category attribute is the selected category content includes, for each subtitle line of the subtitles, determining whether the category attribute exists in each subtitle line; if the category attribute exists in each subtitle line, determining whether the attribute value of the category attribute is the category content selected by the user; and if the attribute value of the category attribute is the category content selected by the user, displaying each subtitle line for which the attribute value of the category attribute is the selected category content.

With reference to the first possible implementation manner of the first aspect, in a third possible implementation manner, the method further includes: displaying the subtitles that exclude the category attribute.

With reference to the third possible implementation manner of the first aspect, in a fourth possible implementation manner, the displaying the subtitles that exclude the category attribute includes, for each subtitle line of the subtitles, determining whether the category attribute exists in each subtitle line; and if the category attribute is absent from each subtitle line, displaying each subtitle line that excludes the category attribute.

With reference to the first five possible implementation manners of the first aspect, in a fifth possible implementation manner, for Timed Text Markup Language (TTML) subtitles, the category label is a nesting label, and the nesting label includes a level 1 label and a level 2 label; and the level 1 label includes a multiple attribute, and the level 2 label includes the category content, where if the multiple is true and when the category content is presented on the display device, multiple pieces of the category content are selected by default; or if the multiple is false and when the category content is presented on the display device, one piece of the category content is selected by default.

With reference to the fifth possible implementation manner of the first aspect, in a sixth possible implementation manner, the level 2 label further includes a selected attribute by default selected attribute, where if the selected is true and when the category content is presented on the display device, the category content corresponding to the selected attribute is selected by default.

With reference to the fifth possible implementation manner of the first aspect, in a seventh possible implementation manner, if all of the level 2 labels exclude a selected attribute, if the multiple is true and when the category content is presented on the display device, category content included in all of the level 2 labels is selected by default; or if the multiple is false and when the category content is presented on the display device, category content included in the first one of the level 2 labels is selected by default.

With reference to the first five possible implementation manners of the first aspect, in an eighth possible implementation manner, for SubRip Text (SRT) subtitles, the category label further includes a selected attribute, where if the selected is true and when the category content is presented on the display device, the category content corresponding to the selected attribute is selected by default.

According to another aspect, a subtitle display device is provided, including a receiving module configured to receive a subtitle file; a parsing module configured to parse a category label of the subtitle file received by the receiving module according to the subtitle file, where the category label includes category content; an interaction module configured to present, on the subtitle display device in an interactive graphic manner, the category content obtained by parsing performed by the parsing module, for a user to perform selection; and a display module configured to receive a result of selecting one or more pieces of the category content by the user, and display, according to the selection result, subtitles corresponding to the selected category content.

In a first possible implementation manner of a second aspect, that the display module is configured to display subtitles corresponding to the selected category content includes the display module is configured to display the subtitles for which an attribute value of a category attribute is the selected category content.

With reference to the first possible implementation manner of the second aspect, in a second possible implementation manner, for each subtitle line of the subtitles, the display module is configured to determine whether the category attribute exists in each subtitle line; if the category attribute exists in each subtitle line, determine whether the attribute value of the category attribute is the category content selected by the user; and if the attribute value of the category attribute is the category content selected by the user, display each subtitle line for which the attribute value of the category attribute is the selected category content.

With reference to the first possible implementation manner of the second aspect, in a third possible implementation manner, the display module is further configured to display the subtitles that exclude the category attribute.

With reference to the third possible implementation manner of the second aspect, in a fourth possible implementation manner, for each subtitle line of the subtitles, the display module is further configured to determine whether the category attribute exists in each subtitle line; and if the category attribute is absent from each subtitle line, display each subtitle line that excludes the category attribute.

With reference to the first five possible implementation manners of the second aspect, in a fifth possible implementation manner, for TTML subtitles, the category label parsed by the parsing module is a nesting label, and the nesting label includes a level 1 label and a level 2 label; and the level 1 label includes a multiselect multiple attribute, and the level 2 label includes the category content, where the interaction module is further configured to, if the multiple is true and when the category content is presented on the subtitle display device, select by default multiple pieces of the category content; or if the multiple is false and when the category content is presented on the subtitle display device, select by default one piece of the category content.

With reference to the fifth possible implementation manner of the second aspect, in a sixth possible implementation manner, if the level 2 label of the category label parsed by the parsing module further includes a selected attribute by default selected attribute, the interaction module is further configured to, if the selected is true and when the category content is presented on the subtitle display device, select by default the category content corresponding to the selected attribute.

With reference to the fifth possible implementation manner of the second aspect, in a seventh possible implementation manner, if all level 2 labels of the category label parsed by the parsing module exclude a selected attribute, the interaction module is further configured to, if the multiple is true and when the category content is presented on the subtitle display device, select by default category content included in all of the level 2 labels; or if the multiple is false and when the category content is presented on the subtitle display device, select by default category content included in the first one of the level 2 labels.

With reference to the first five possible implementation manners of the second aspect, in an eighth possible implementation manner, for external subtitles, the category label parsed by the parsing module includes a selected attribute; and the interaction module is further configured to, if the selected is true and when the category content is presented on the display device, select by default the category content corresponding to the selected attribute.

Embodiments of the present disclosure provide a subtitle display method and a subtitle display device. The method includes receiving a subtitle file, and parsing a category label of the subtitle file, where the category label includes category content; presenting, on a display device in an interactive graphic manner, the category content for a user to perform selection; and receiving a result of selecting one or more pieces of the category content by the user, and displaying, according to the selection result, subtitles corresponding to the selected category content. In this way, the category content is presented to the user in the interactive graphic manner, so that the user can select category content according to the user's preference, and the subtitle display device presents subtitles corresponding to the category content, thereby improving user experience.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides a subtitle display method. The method includes receiving a subtitle file, and parsing a category label of the subtitle file, where the category label includes category content; presenting, on a display device in an interactive graphic manner, the category content for a user to perform selection; and receiving a result of selecting one or more pieces of the category content by the user, and displaying, according to the selection result, subtitles corresponding to the selected category content.

It should be noted that, first, the category content may be any category, for example, may be a dialogue category or a scene category, or may certainly be any other category, which is not limited herein.

Second, subtitles in the subtitle file consist of lines of subtitles.

Third, for TTML subtitles, the category label may be set in any location of the subtitle file, for example, in a header of the subtitle file, or a content part of the subtitle file, which is not limited herein. For SRT subtitles, the category label is generally set in the header of the subtitle file.

Fourth, the category label may be case-sensitive, or may be case-insensitive in specific implementation, which is set according to an actual situation and is not limited in embodiments of the present disclosure.

This embodiment of the present disclosure provides a subtitle display method. The method includes receiving a subtitle file, and parsing a category label of the subtitle file, where the category label includes category content; presenting, on a display device in an interactive graphic manner, the category content for a user to perform selection; and receiving a result of selecting one or more pieces of the category content by the user, and displaying, according to the selection result, subtitles corresponding to the selected category content. In this way, the category content is presented to the user in the interactive graphic manner, so that the user can select category content according to the user's preference, and the subtitle display device presents subtitles corresponding to the category content, thereby improving user experience.

Optionally, for the TTML subtitles, the category label is a nesting label, and the nesting label includes a level 1 label and a level 2 label. The level 1 label includes a multiple (multiselect) attribute, and the level 2 label includes the category content.

If the multiple is true and when the category content is presented on the display device, multiple pieces of the category content are selected by default; if the multiple is false and when the category content is presented on the display device, one piece of the category content is selected by default.

It should be noted that in this embodiment of the present disclosure, the multiple is preferably true by default.

For example, the category label may be as follows:

```
<class"multiple=true">
    <item"selected=true">Dialogue</item>
    <item>Scene</item>
</class>
```

Herein, <class> is a level 1 label, <item> is a level 2 label, and Dialogue and Scene are category content.

Further optionally, the level 2 label further includes a selected (selected by default) attribute, where if the selected is true and when the category content is presented on the display device, the category content corresponding to the selected attribute is selected by default.

For example, the foregoing category content Dialogue corresponding to the selected attribute is selected by default.

Herein, if the selected is true, if the user does not perform any operation using an interactive graphic, that is, the category content Dialogue corresponding to the selected attribute is selected by default, when the display device performs displaying, subtitles corresponding to the category content are displayed. Certainly, using an interactive graphic, the user may also cancel the category content that is selected by default and reselect a category in which the user is interested. That is, if the user further selects the category content Scene using the interactive graphic, the display device displays subtitles corresponding to Scene in addition to displaying the subtitles corresponding to Dialogue.

It should be noted that a <class> label may appear in a subtitle file multiple times, but only the last one is effective. Therefore, preferably, each subtitle file includes only one class attribute.

In addition, the foregoing level 1 label is named <class>, but the present disclosure is not limited thereto. The level 1 label may also be, for example, <sort> and <roll>. The foregoing level 2 label is named <item>, but the present disclosure is not limited thereto. The level 2 label may also be, for example, <option>.

Alternatively, if all of the level 2 labels exclude the selected attribute, if the multiple is true and when the category content is presented on the display device, category content included in all of the level 2 labels is selected by default; if the multiple is false and when the category content is presented on the display device, category content included in the first one of the level 2 labels is selected by default.

For example, the category label may also be as follows:

```
<class"multiple=true">
    <item>Dialogue</item>
    <item>Scene</item>
</class>
```

When the two types of category content, Dialogue and Scene, are presented on the display device in the interactive graphic manner, and the user does not perform any operation (that is, when the category content is presented on the display device, the category content Dialogue and Scene are both selected by default), the subtitle display device displays subtitles corresponding to Dialogue and Scene.

Based on the foregoing description, optionally, the displaying subtitles corresponding to the selected category content includes displaying the subtitles for which an attribute value of a category attribute is the selected category content.

Herein, a category attribute may be set in each subtitle line of the subtitle file, and an attribute value of the category attribute is limited to the category content. In this way, when a piece of category content is selected, subtitles for which an attribute value of a category attribute is the category content are presented.

For the TTML subtitles, each subtitle line already includes a subtitle label, and therefore, preferably, the category attribute may be directly set in the subtitle label of each subtitle line.

For example, for a TTML subtitle line <p begin="00:00:10"end="00:00:14">Jim and Jerry are talking</p>, a category attribute may be directly set in a subtitle label of the subtitle line, to obtain <p begin="00:00:10"end="00:00:14"class="Scene">Jim and Jerry are talking</p>.

When the user selects category content Scene using an interactive graphical interface, the subtitle line <p begin="00:00:10"end="00:00:14"class="Scene">Jim and Jerry are talking</p> is displayed.

Herein, a name class attribute of the category attribute is only for a schematic purpose and is not limited.

Further optionally, the displaying the subtitles for which an attribute value of a category attribute is the selected category content includes, for each subtitle line of the subtitles, determining whether the category attribute exists in each subtitle line; if the category attribute exists in each subtitle line, determining whether the attribute value of the category attribute is the category content selected by the user; and if the attribute value of the category attribute is the category content selected by the user, displaying each subtitle line for which the attribute value of the category attribute is the selected category content.

For example, for the subtitle line <p begin="00:00:15"end="00:00:19"class="Dialogue">How are you!</p> in a subtitle file, first, it may be learned, by means of determining, that a category attribute exists in the subtitle line, and an attribute value of the category attribute is Dialogue. If the user also selects a Dialogue category, the subtitle display device displays the subtitle line, that is, displays How are you! from 00:00:15 to 00:00:19. If the user selects a Scene category, the subtitle display device does not display the subtitle line.

Optionally, in addition to displaying the subtitles for which an attribute value of a category attribute is the selected category content, the method may further include displaying the subtitles that exclude the category attribute.

Herein, a category attribute may be set in some subtitle lines of a subtitle file, and a category attribute may not be set in other subtitle lines. In this way, when a piece of category content is selected, subtitles for which an attribute value of a category attribute is the category content are selected, and other subtitles that exclude the category attribute are also selected.

Further, the displaying the subtitles that exclude the category attribute includes for each subtitle line of the subtitles, determining whether the category attribute exists in each subtitle line; and if the category attribute is absent from each subtitle line, displaying each subtitle line that excludes the category attribute.

For example, for the subtitle line <p begin="00:00:30"end="00:00:34">Thank you!</p> in a subtitle file, it may be learned, by means of determining, that a category attribute is absent from the subtitle line, and therefore, the subtitle display device directly displays the subtitle line, that is, displays Thank you! from 00:00:30 to 00:00:34.

Exemplarily, the following several subtitle lines in the subtitle file are, for example, as follows:

```
<p begin="00:00:10"end="00:00:14"class="Scene">Jim and Jerry are talking</p>
<p begin="00:00:15"end="00:00:19"class="Dialogue">How are you!</p>
<p begin="00:00:20"end="00:00:24"class="Dialogue">Fine. Thank you</p>
<p begin="00:00:25"end="00:00:29"class="Scene">Talking end</p>
<p begin="00:00:30"end="00:00:34">Thank you!</p>
```

If the user selects a Dialogue category using an interactive graphic, the following subtitles are displayed:
How are you! is displayed from 00:00:15 to 00:00:19;
Fine. Thank you is displayed from 00:00:20 to 00:00:24; and
Thank you! is displayed from 00:00:30 to 00:00:34.

If the user selects a Scene category using an interactive graphic, the following subtitles are displayed:
Jim and Jerry are talking is displayed from 00:00:10 to 00:00:14;
Talking end is displayed from 00:00:25 to 00:00:29; and
Thank you! is displayed from 00:00:30 to 00:00:34.

If the user selects none, the following subtitles are displayed:
Thank you! is displayed from 00:00:30 to 00:00:34.

If the user selects both the Dialogue category and the Scene category, the following subtitles are displayed:
Jim and Jerry are talking is displayed from 00:00:10 to 00:00:14;
How are you! is displayed from 00:00:15 to 00:00:19;
Fine. Thank you is displayed from 00:00:20 to 00:00:24;
Talking end is displayed from 00:00:25 to 00:00:29; and
Thank you! is displayed from 00:00:30 to 00:00:34.

It can be seen from the foregoing description that if a subtitle line or some subtitle lines in the subtitle file excludes or exclude the category attribute, that is, no category attribute is set in a subtitle label of the subtitle line, for example, a subtitle line <p begin="00:00:30"end="00:00:34">Thank you!</p> in the foregoing example, no matter which piece of category content the user selects, the subtitle line is displayed during subtitle displaying. That is, subtitles that exclude the category attribute are not restricted by the category label.

It should be noted that, for the subtitle file, no category attribute may be set in each subtitle line of the subtitle file. In this case, no matter which pieces of category content are selected by the user using the interactive graphical interface, all subtitles are displayed.

Embodiment 1

Figure 1:
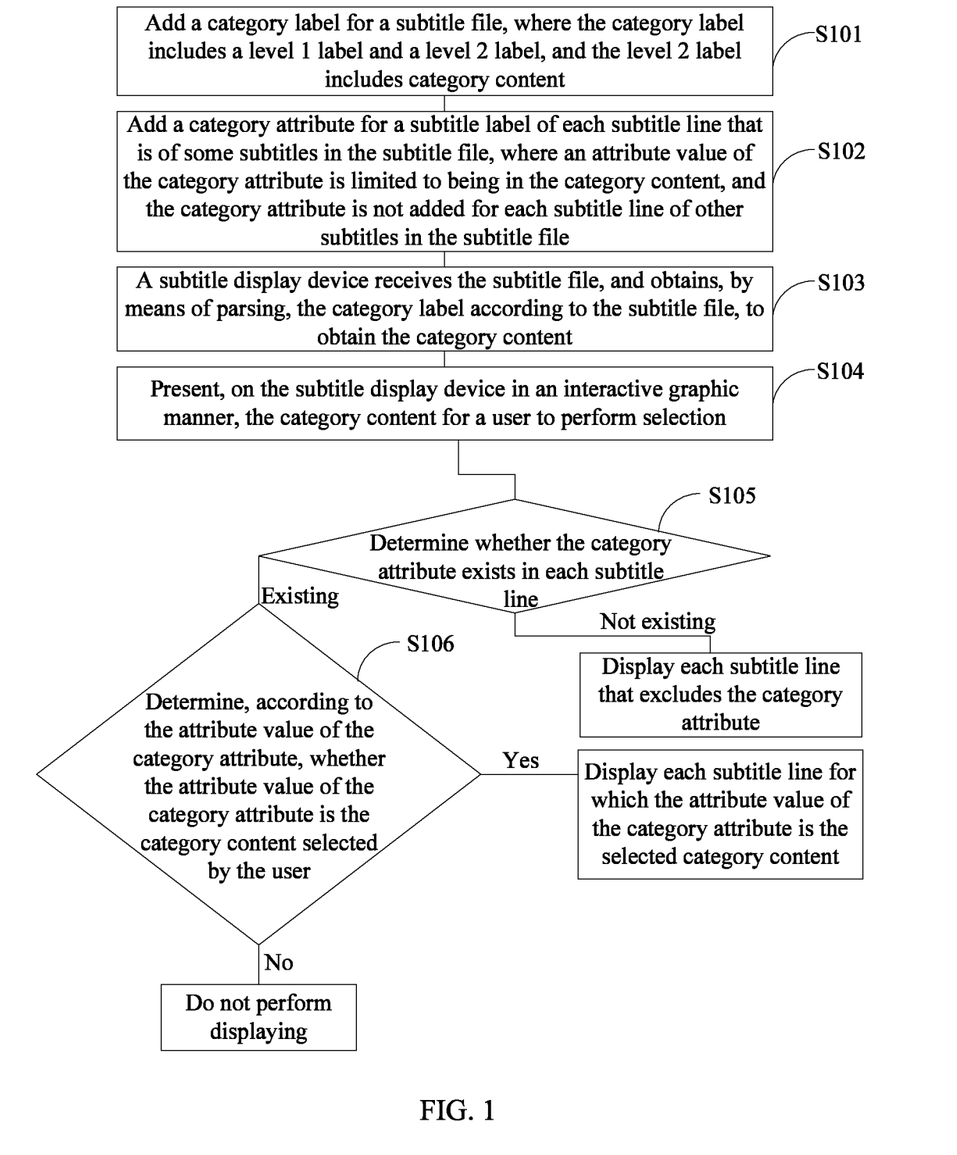
FIG. 1 is a schematic flowchart of a subtitle display method according to Embodiment 1 of the present disclosure.

This embodiment of the present disclosure provides a TTML subtitle display method. As shown in FIG. 1, the method includes the following steps.

S101: Add a category label for a subtitle file, where the category label includes a level 1 label and a level 2 label, and the level 2 label includes category content.

Herein, the category label may be, for example, as follows:

```
<class"multiple=true">
    <item"selected=true">Dialogue</item>
    <item>Scene</item>
</class>
```

The level 1 label is <class>, and the level 2 label is <item>. The level 1 label includes a attribute multiple attribute, and the level 2 label includes a selected attribute. Category content is Dialogue and Scene.

S102: Add a category attribute for a subtitle label of each subtitle line that is of some subtitles in the subtitle file, where an attribute value of the category attribute is limited to being in the category content, and the category attribute is not added for each subtitle line of other subtitles in the subtitle file.

Herein, for example, there are the following several subtitle lines:

```
<p begin="00:00:10"end="00:00:14"class="Scene">Jim and Jerry are talking</p>
<p begin="00:00:15"end="00:00:19"class="Dialogue">How are you!</p>
<p begin="00:00:20"end="00:00:24"class="Dialogue">Fine. Thank you</p>
<p begin="00:00:25"end="00:00:29"class="Scene">Talking end</p>
```

Certainly, the category attribute may not be added, such as the following subtitle line:
<p begin="00:00:30"end="00:00:34">Thank you!</p>

Herein, it should be noted that this embodiment of the present disclosure is not limited to a case in step S102. The category attribute may be added for all subtitles in the subtitle file, or the category attribute may not be added for all subtitles in the subtitle file.

S103: A subtitle display device receives the subtitle file, and obtains, by means of parsing, the category label according to the subtitle file, to obtain the category content.

Herein, for example, two pieces of category content, that is, Dialogue and Scene, are obtained according to the category label in the subtitle file.

S104: Present, on the subtitle display device in an interactive graphic manner, the category content for a user to perform selection.

Herein, when the category content is presented to the user according to attributes of the level 1 label and level 2 label of the foregoing category label, multiple pieces of the category content are selected by default. Herein, only that Dialogue is selected by default is shown.

S105: Determine whether the category attribute exists in each subtitle line; and if the category attribute exists in each subtitle line, perform S106; or if the category attribute is absent from each subtitle line, directly display each subtitle line that excludes the category attribute.

S106: Determine, according to the attribute value of the category attribute, whether the attribute value of the category attribute is the category content selected by the user; and if the attribute value of the category attribute is the category content selected by the user, display each subtitle line for which the attribute value of the category attribute is the selected category content; or if the attribute value of the category attribute is not the category content selected by the user, skip performing displaying.

Herein, there are several cases. A first case is that in step S104, the user does not perform any operation on an interactive graphic, that is, the user selects Dialogue by default. In this case, for example, only the following subtitles are displayed:

How are you! is displayed from 00:00:15 to 00:00:19;
Fine. Thank you is displayed from 00:00:20 to 00:00:24; and
Thank you! is displayed from 00:00:30 to 00:00:34.

A second case is that in step S104, using an interactive graphic, the user cancels Dialogue selected by default and reselects Scene. In this case, for example, only the following subtitles are displayed:

Jim and Jerry are talking is displayed from 00:00:10 to 00:00:14;
Talking end is displayed from 00:00:25 to 00:00:29; and
Thank you! is displayed from 00:00:30 to 00:00:34.

A third case is that in step S104, the user cancels, using an interactive graphic, Dialogue selected by default, that is, selects none. In this case, for example, only the following subtitles are displayed:

Thank you! is displayed from 00:00:30 to 00:00:34.

A fourth case is that in step S104, if the user selects Dialogue by default, the user also selects Scene using an interactive graphic. In this case, for example, the following subtitles are displayed:

Jim and Jerry are talking is displayed from 00:00:10 to 00:00:14;
How are you! is displayed from 00:00:15 to 00:00:19;
Fine. Thank you is displayed from 00:00:20 to 00:00:24;
Talking end is displayed from 00:00:25 to 00:00:29; and
Thank you! is displayed from 00:00:30 to 00:00:34.

This embodiment of the present disclosure provides a subtitle display method. The method includes receiving, by a subtitle display device, a subtitle file, and obtaining, by means of parsing, a category label according to the subtitle file, where the category label includes category content; presenting, on the subtitle display device in an interactive graphic manner, the category content for a user to perform selection; and if the user selects one or more pieces of the category content, receiving, by the subtitle display device, a result of selecting the one or more pieces of the category content by the user, and displaying, according to the selection result, subtitles corresponding to the selected category content. In this way, the category content is presented to the user in the interactive graphic manner, so that the user can select category content according to the user's preference, and the subtitle display device presents subtitles corresponding to the category content, thereby improving user experience.

For SRT subtitles, each subtitle line does not include a subtitle label, and therefore, the category attribute needs to be set in each subtitle line by adding a subtitle label.

For example, for an SRT subtitle line Jim and Jerry are talking, a category attribute is set in the subtitle line by adding a subtitle label, to obtain <class value="Scene">Jim and Jerry are talking</class>.

Optionally, for the SRT subtitles, the category label includes a selected attribute in addition to category content. If the selected is true and when the category content is presented on the display device, the category content corresponding to the selected attribute is selected by default.

For the SRT subtitles, the category label is set in a header of the subtitle file.

Embodiment 2

Figure 2:
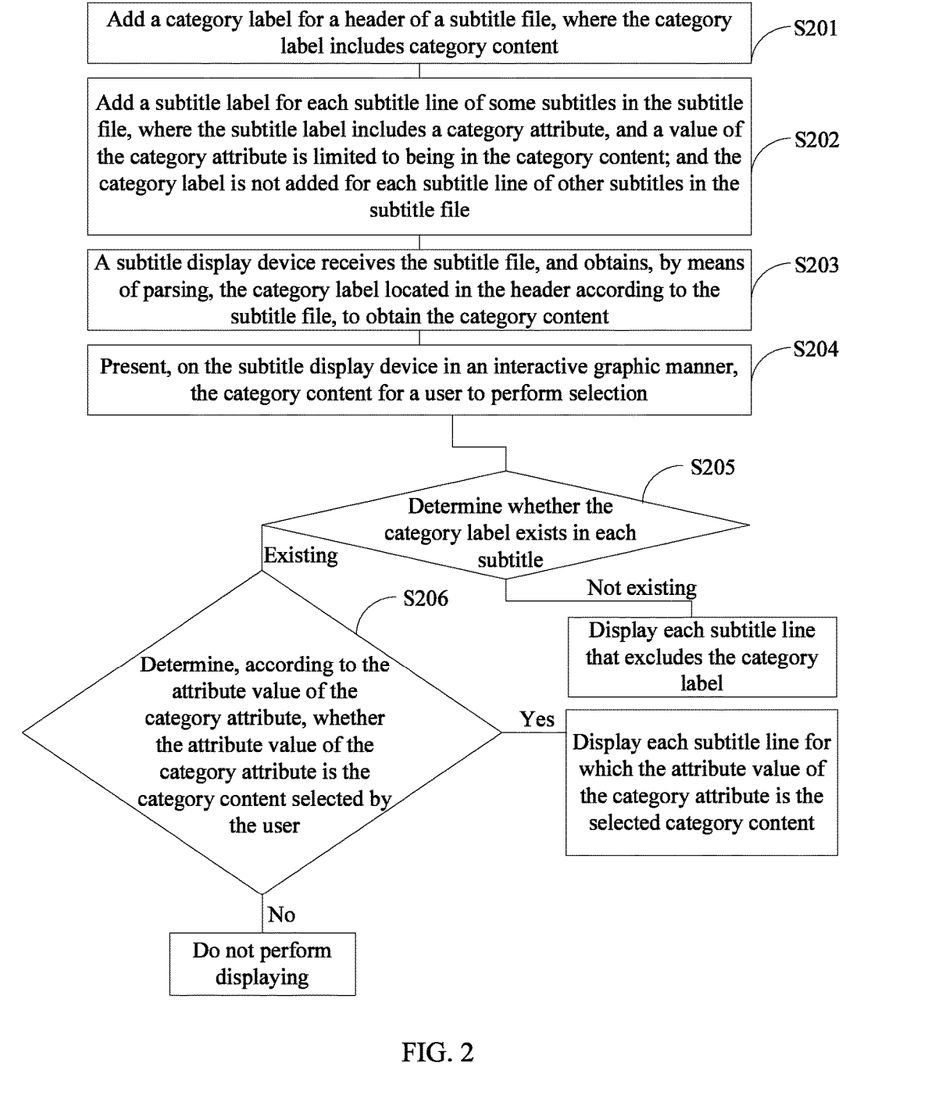
FIG. 2 is a schematic flowchart of a subtitle display method according to Embodiment 2 of the present disclosure.

This embodiment of the present disclosure provides a subtitle display method. As shown in FIG. 2, the method includes the following steps.

S201: Add a category label for a header of a subtitle file, where the category label includes category content and a selected attribute.

Herein, the category label is a non-nesting label. A label format of the category label may be, for example, as follows:

---
<class"selected=true">Dialogue</item>
<class>Scene</item>
---

Dialogue and Scene are category content.

S202: Add a subtitle label for each subtitle line of some subtitles in the subtitle file, where the subtitle label includes a category attribute, and a value of the category attribute is limited to being in the category content; and the category label is not added for each subtitle line of other subtitles in the subtitle file.

Herein, for example, there are the following several subtitle lines:

1
00:00:10,000→00:00:14,000
<class value="Scene">Jim and Jerry are talking</class>
2
00:00:15,000→00:00:19,000
<class value="Dialogue">How are you!</class>
3
00:00:20,000→00:00:24,000
<class value="Dialogue">Fine. Thank you</class>
4
00:00:25,000→00:00:29,000
<class value="Scene">Talking end</class>

Certainly, the category label may not be added to a subtitle line, such as the following subtitle line:

5
00:00:30,000→00:00:34,000
Thank you!

Herein, a label name of the subtitle label may be the same as or different from a label name of the category label, which is not limited herein.

Herein, it should be noted that this embodiment of the present disclosure is not limited to a case in step S202. The category attribute may be added for all subtitles in the subtitle file, or the category attribute may not be added for all subtitles in the subtitle file.

S203: A subtitle display device receives the subtitle file, and obtains, by means of parsing, the category label located in the header according to the subtitle file, to obtain the category content.

Herein, for example, two pieces of category content, that is, Dialogue and Scene, are obtained according to the category label in the header of the subtitle file.

S204: Present, on the subtitle display device in an interactive graphic manner, the category content for a user to perform selection.

Herein, the user may select one piece of category content or may select multiple pieces of category content according to the interactive graphic.

S205: Determine whether the category label exists in each subtitle line; and if the category label exists in each subtitle line, perform S206; or if the category label is absent from each subtitle line, directly display each subtitle line that excludes the category label.

S206: Determine, according to the attribute value of the category attribute, whether the attribute value of the category attribute is the category content selected by the user; and if the attribute value of the category attribute is the category content selected by the user, display each subtitle line for which the attribute value of the category attribute is the selected category content; or if the attribute value of the category attribute is not the category content selected by the user, skip performing displaying.

Herein, there are several cases. A first case is that in step S204, the user selects Dialogue by default using the interactive graphic. In this case, for example, only the following subtitles are displayed:

How are you! is displayed from 00:00:15 to 00:00:19;
Fine. Thank you is displayed from 00:00:20 to 00:00:24; and
Thank you! is displayed from 00:00:30 to 00:00:34.

A second case is that in step S204, the user selects Scene using the interactive graphic. In this case, for example, only the following subtitles are displayed:

Jim and Jerry are talking is displayed from 00:00:10 to 00:00:14;
Talking end is displayed from 00:00:25 to 00:00:29; and
Thank you! is displayed from 00:00:30 to 00:00:34.

A third case is that in step S204, the user selects none. In this case, for example, only the following subtitles are displayed:

Thank you! is displayed from 00:00:30 to 00:00:34.

A fourth case is that in step S204, the user selects Dialogue and Scene using the interactive graphic. In this case, for example, the following subtitles are displayed:

Jim and Jerry are talking is displayed from 00:00:10 to 00:00:14;
How are you! is displayed from 00:00:15 to 00:00:19;
Fine. Thank you is displayed from 00:00:20 to 00:00:24;
Talking end is displayed from 00:00:25 to 00:00:29; and
Thank you! is displayed from 00:00:30 to 00:00:34.

It should be noted that, for the subtitle file, no category attribute may be set in each subtitle line of the subtitle file. In this case, no matter which pieces of category content are selected by the user using an interactive graphical interface, all subtitles are displayed.

This embodiment of the present disclosure provides a subtitle display method. The method includes: receiving, by a subtitle display device, a subtitle file, and obtaining, by means of parsing, a category label according to the subtitle file, where the category label includes category content; presenting, on the subtitle display device in an interactive graphic manner, the category content for a user to perform selection; and if the user selects one or more pieces of the category content, receiving, by the subtitle display device, a result of selecting the one or more pieces of the category content by the user, and displaying, according to the selection result, subtitles corresponding to the selected category content. In this way, the category content is presented to the user in the interactive graphic manner, so that the user can select category content according to the user's preference, and the subtitle display device presents subtitles corresponding to the category content, thereby improving user experience.

Figure 3:
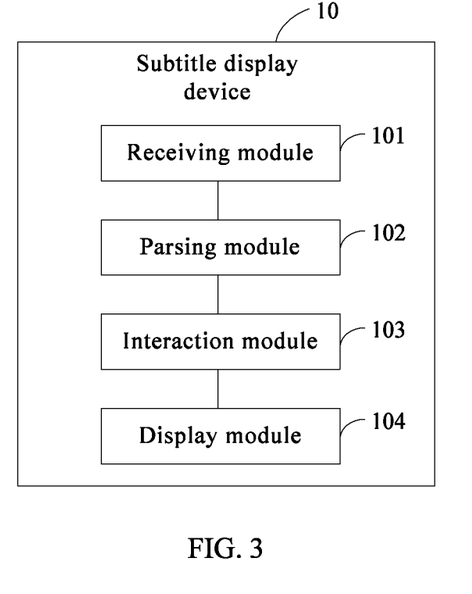
FIG. 3 is a schematic structural diagram of a subtitle display device according to an embodiment of the present disclosure.

An embodiment of the present disclosure provides a subtitle display device 10. The subtitle display device 10 is corresponding to the subtitle display device in the subtitle display method provided in the foregoing embodiments. Therefore, a specific description of modules may be the description of the foregoing steps, and details are not described herein again.

As shown in FIG. 3, the subtitle display device 10 includes:

a receiving module 101 configured to receive a subtitle file, where the subtitle file may include a category label, and the category label includes category content; and a parsing module 102 configured to parse the category label of the subtitle file received by the receiving module 101 according to the subtitle file, where the category label includes the category content.

For TTML subtitles, the category label parsed by the parsing module 102 is a nesting label, and the nesting label includes a level 1 label and a level 2 label. The level 1 label includes a attribute multiple attribute, and the level 2 label includes the category content.

Further optionally, the level 2 label may further include a selected attribute in addition to the category content.

For example, the category label may be as follows:

```
<class"multiple=true">
    <item"selected=true">Dialogue</item>
    <item>Scene</item>
</class>
```

Herein, <class> is a level 1 label, and <item> is a level 2 label. Dialogue and Scene are category content.

Certainly, all level 2 labels of the category label parsed by the parsing module 102 may exclude the selected attribute.

For example, for the TTML subtitles, the category label may be as follows:

```
<class"multiple=true">
    <item>Dialogue</item>
    <item>Scene</item>
</class>
```

Alternatively, for SRT subtitles, the category label parsed by the parsing module 102 includes the selected attribute.

Exemplarily, for the SRT subtitles, the category label may be, for example, as follows:

```
<class"selected=true">Dialogue</item>
<class>Scene</item>
```

An interaction module 103 is configured to present, on the subtitle display device in an interactive graphic manner, the category content obtained by parsing performed by the parsing module 103, for a user to perform selection.

For the TTML subtitles, if the category label parsed by the parsing module 102 is the nesting label, and the level 1 label of the nesting label includes the attribute multiple, optionally, the interaction module 103 is further configured to, if the multiple is true and when the category content is presented on the subtitle display device, select by default multiple pieces of the category content; or if the multiple is false and when the category content is presented on the subtitle display device, select by default one piece of the category content.

Further optionally, if the level 2 label of the category label parsed by the parsing module 102 further includes the selected attribute, the interaction module 103 is further configured to, if the selected is true and when the category content is presented on the subtitle display device, select by default the category content corresponding to the selected attribute.

For example, the category label parsed by the parsing module 102 may be as follows:

```
<class"multiple=true">
    <item"selected=true">Dialogue</item>
    <item>Scene</item>
</class>
```

In this case, when the interaction module 103 presents category content Dialogue and Scene on the subtitle display device in the interactive graphic manner, Dialogue is selected by default at the same time. Certainly, based on Dialogue selected by default, the user may further select Scene using an interactive graphic; or using an interactive graphic, the user may cancel Dialogue selected by default and select Scene instead. Details are not described herein again.

Alternatively, if all level 2 labels of the category label parsed by the parsing module 102 exclude the selected attribute, the interaction module 103 is further configured to, if the multiple is true and when the category content is presented on the subtitle display device, select by default category content included in all of the level 2 labels; or if the multiple is false and when the category content is presented on the subtitle display device, select by default category content included in the first one of the level 2 labels.

For example, the category label parsed by the parsing module 102 may be as follows:

```
<class"multiple=true">
    <item>Dialogue</item>
    <item>Scene</item>
</class>
```

In this case, when the interaction module 103 presents category content Dialogue and Scene on the subtitle display device in the interactive graphic manner, Dialogue and Scene are selected by default at the same time. Certainly, the user may perform another operation of selection or deleting selection, and details are not described herein again.

For the SRT subtitles, if the category label parsed by the parsing module 102 includes the selected attribute, the interaction module 103 is further configured to, if the selected is true, present the category content on the subtitle display device, and select by default the category content corresponding to the selected attribute.

For example, the category label parsed by the parsing module 102 may be as follows:

```
<class"selected=true">Dialogue</item>
<class>Scene</item>
```

In this case, when the interaction module 103 presents category content Dialogue and Scene on the subtitle display device in the interactive graphic manner, Dialogue is selected by default at the same time.

A display module 104 is configured to receive a result of selecting one or more pieces of the category content by the user, and display, according to the selection result, subtitles corresponding to the selected category content.

Exemplarily, the category label may be, for example, as follows:

```
<class"multiple=true">
    <item"selected=true">Dialogue</item>
    <item>Scene</item>
</class>
```

When the interaction module 103 presents the two types of category content, Dialogue and Scene, on the subtitle display device in the interactive graphic manner, and the user does not perform any operation (that is, the user selects Dialogue by default), the display module 104 displays subtitles corresponding to Dialogue. When the user further selects Scene using an interactive graphic, the display module 104 further displays subtitles corresponding to Scene in addition to the subtitles corresponding to Dialogue. Certainly, using an interactive graphic, the user may also cancel Dialogue selected by default and select Scene instead. In this way, the display module 104 displays the subtitles corresponding to Scene.

Further optionally, the display module 104 is configured to display the subtitles for which an attribute value of a category attribute is the selected category content.

For the TTML subtitles, for example, the subtitle file includes the following several subtitle lines:

```
<p begin="00:00:10"end="00:00:14"class="Scene">Jim and Jerry are talking</p>
<p begin="00:00:15"end="00:00:19"class="Dialogue">How are you!</p>
<p begin="00:00:20"end="00:00:24"class="Dialogue">Fine. Thank you</p>
<p begin="00:00:25"end="00:00:29"class="Scene">Talking end</p>
```

If the user selects Dialogue using the interactive graphic, the display module 104 displays the following subtitles:

How are you! is displayed from 00:00:15 to 00:00:19; and
Fine. Thank you is displayed from 00:00:20 to 00:00:24.

If the user selects Scene using the interactive graphic, the display module 104 displays the following subtitles:

Jim and Jerry are talking is displayed from 00:00:10 to 00:00:14; and
Talking end is displayed from 00:00:25 to 00:00:29.

If the user selects Dialogue and Scene using the interactive graphic, the display module 104 displays the following subtitles:

Jim and Jerry are talking is displayed from 00:00:10 to 00:00:14;
How are you! is displayed from 00:00:15 to 00:00:19; and Fine. Thank you is displayed from 00:00:20 to 00:00:24.

Further optionally, for each subtitle line of the subtitles, the display module 104 is configured to determine whether the category attribute exists in each subtitle line; if the category attribute exists in each subtitle line, determine whether the attribute value of the category attribute is the category content selected by the user; and if the attribute value of the category attribute is the category content selected by the user, display each subtitle line for which the attribute value of the category attribute is the selected category content.

For example, for the following TTML subtitle line <p begin="00:00:10"end="00:00:14"class="Scene">Jim and Jerry are talking</p>, first, the display module 104 obtains, by means of determining, that a category attribute exists in the subtitle line, then determines whether an attribute value Scene of the category attribute is category content selected by the user; and if the user selects Scene, displays the subtitle line; or if the user does not select Scene, skips performing displaying.

Further, the display module 104 is further configured to display the subtitles that exclude the category attribute.

For the TTML subtitles, for example, the subtitle file includes the following one subtitle line:

<p begin="00:00:30"end="00:00:34">Thank you!</p>

No matter which piece or which pieces of category content is or are selected by the user using an interactive graphical interface, the display module 104 displays Thank you! from 00:00:30 to 00:00:34.

Further optionally, for each subtitle line of the subtitles, the display module 104 is further configured to determine whether the category attribute exists in each subtitle line; and if the category attribute is absent from each subtitle line, display each subtitle line that excludes the category attribute.

It should be noted that, for the subtitle file, no category attribute may be set in each subtitle line of the subtitle file. In this case, no matter which pieces of category content are selected by the user using the interactive graphical interface, all subtitles are displayed.

For the SRT subtitles, a display method is also similar. Reference may be made to the method Embodiment 2, and details are not described herein again.

This embodiment of the present disclosure provides a subtitle display device, including a receiving module, a parsing module, an interaction module, and a display module. After the receiving module receives a subtitle file, the parsing module parses a category label according to the subtitle file, where the category label includes category content; the interaction module presents, on the subtitle display device in an interactive graphic manner, the category content for a user to perform selection; and if the user selects one or more pieces of the category content, the display module receives a result of selecting the one or more pieces of the category content by the user, and displays, according to the selection result, subtitles corresponding to the selected category content. In this way, the category content is presented to the user in the interactive graphic manner, so that the user can select category content according to the user's preference, and the subtitle display device presents subtitles corresponding to the category content, thereby improving user experience.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

The invention claimed is:

1. A subtitle display method, comprising:
   receiving a subtitle file;
   obtaining a category label of the subtitle file by means of parsing, wherein the category label comprises category content;
   presenting, on a display device in an interactive graphic manner, the category content for a user to perform selection;
   receiving a result of selecting one or more pieces of the category content by the user to form a selected category content; and
   displaying, according to the result of selecting, subtitles for which an attribute value of a category attribute is the selected category content by:
      determining whether the category attribute exists in each subtitle line of the subtitles;
      determining whether the attribute value of the category attribute is the category content selected by the user when the category attribute exists in each subtitle line; and
      displaying each subtitle line for which the attribute value of the category attribute is the selected category content when the attribute value of the category attribute is the category content selected by the user.

2. The method according to claim 1, further comprising displaying subtitles that exclude the category attribute.

3. The method according to claim 2, wherein displaying the subtitles that exclude the category attribute comprises:
   determining whether the category attribute exists in each subtitle line of the subtitles; and
   displaying each subtitle line that excludes the category attribute when the category attribute is absent from each subtitle line.

4. The method according to claim 1, wherein for Timed Text Markup Language (TTML) subtitles, the category label is a nesting label comprising a level 1 label and a level 2 label, wherein the level 1 label comprises a multiselect multiple attribute, wherein the level 2 label comprises the category content, wherein multiple pieces of the category content are selected by default when the multiple is true and when the category content is presented on the display device, and wherein one piece of the category content is selected by default when the multiple is false and when the category content is presented on the display device.

5. The method according to claim 4, wherein the level 2 label further comprises a selected attribute by default selected attribute, and wherein the category content corresponding to the selected attribute is selected by default when the selected is true and when the category content is presented on the display device.

6. The method according to claim 4, wherein category content comprised in all of the level 2 labels is selected by default when all of the level 2 labels exclude a selected attribute and when the multiple is true and when the category content is presented on the display device, and wherein category content comprised in a first one of the level 2 labels is selected by default when the multiple is false and when the category content is presented on the display device.

7. The method according to claim 1, wherein for SubRip Text (SRT) subtitles, the category label further comprises a selected attribute, wherein the category content corresponding to the selected attribute is selected by default when the selected is true and when the category content is presented on the display device.

8. A subtitle display device, comprising:
a receiver configured to receive a subtitle file;
a processor coupled to a memory and configured to:
parse a category label of the subtitle file obtain a category label of the subtitle file by means of parsing the subtitle file received by the receiver, wherein the category label comprises category content;
present, on the subtitle display device in an interactive graphic manner, the category content obtained by parsing, for a user to perform selection; and
a display coupled to the processor and configured to:
receive a result of selecting one or more pieces of the category content by the user to form a selected category content; and
display, according to the result of selecting, subtitles for which an attribute value of a category attribute is the selected category content,
wherein for each subtitle line of the subtitles, the display is configured to:
determine whether the category attribute exists in each subtitle line;
determine whether the attribute value of the category attribute is the category content selected by the user when the category attribute exists in each subtitle line; and
display each subtitle line for which the attribute value of the category attribute is the selected category content when the attribute value of the category attribute is the category content selected by the user.

9. The subtitle display device according to claim 8, wherein the display is further configured to display the subtitles that exclude the category attribute.

10. The subtitle display device according to claim 9, wherein for each subtitle line of the subtitles, the display is further configured to:
determine whether the category attribute exists in each subtitle line; and
display each subtitle line that excludes the category attribute when the category attribute is absent from each subtitle line.

11. The subtitle display device according to claim 8, wherein for Timed Text Markup Language (TTML) subtitles, the category label parsed by the processor is a nesting label, and the nesting label comprises a level 1 label and a level 2 label; and the level 1 label comprises a multiselect multiple attribute, and the level 2 label comprises the category content, wherein the processor is further configured to:
select by default multiple pieces of the category content when the multiple is true and when the category content is presented on the subtitle display device; and
select by default one piece of the category content when the multiple is false and when the category content is presented on the subtitle display device.

12. The subtitle display device according to claim 11, wherein when the level 2 label of the category label parsed by the processor further comprises a selected attribute by default selected attribute, the processor is further configured to select by default the category content corresponding to the selected attribute when the selected is true and when the category content is presented on the subtitle display device.

13. The subtitle display device according to claim 11, wherein when all level 2 labels of the category label parsed by the processor exclude a selected attribute, the processor is further configured to:
select by default category content comprised in all of the level 2 labels when the multiple is true and when the category content is presented on the subtitle display device; and
select by default category content comprised in a first one of the level 2 labels when the multiple is false and when the category content is presented on the subtitle display device.

14. The subtitle display device according to claim 8, wherein for SubRip Text (SRT) subtitles, the category label parsed by the processor comprises a selected attribute, and wherein the processor is further configured to select by default the category content corresponding to the selected attribute when the selected is true and when the category content is presented on the subtitle display device.

* * * * *